3,465,002
(SUCCINIMIDOARYLOXY)ALKANOIC ACIDS,
ESTERS AND AMIDES THEREOF
William A. Bolhofer, Frederick, and John J. Baldwin, Lansdale, Pa., assignors to Merck & Co., Inc., Rahway, N.J., a corporation of New Jersey
No Drawing. Filed Apr. 8, 1966, Ser. No. 541,116
Int. Cl. C07d 27/10; A01n 9/20
U.S. Cl. 260—326.3                    6 Claims

ABSTRACT OF THE DISCLOSURE (Succinimidoaryloxy) alkanoic acid products wherein the succinimido moiety may be substituted by halogen or by alkylidene and wherein the benzene ring may be substituted by from one to four alkyl, alkoxy or halogen radicals or by a divalent hydrocarbylene chain and the salts, esters and amide derivatives thereof. The said products are diuretic and saluretic agents which are useful in the treatment of edema and hypertension.

The products may be prepared by three routes: (1) via the reaction of an N-(carboxyalkoxyaryl)succinamic acid with a base; or, when the nuclear halogenated products are desired, (2) by the reaction of an N-(carboxyalkoxyaryl)-maleamic acid with a reagent capable of effecting halogenation and ring closure, or (3) by treating the appropriate (maleimiboaryloxy) alkanoic acid with a halogenating agent.

---

This invention relates to a new class of chemical compounds which can be described generally as (succinimidoaryloxy)alkanoic acids and to the nontoxic, pharmacologically acceptable salt, ester and amide derivatives thereof.

Also, it is an object of this invention to describe a novel method of preparation for the aforementioned (succinimidoaryloxy)alkanoic acids and their salt, ester and amide derivatives.

Pharmacological studies show that the instant products are effective diuretic and saluretic agents which can be used in the treatment of conditions associated wih electrolyte and fluid retention and hypertension. When administered in therapeutic dosages, in conventional vehicles, the instant products effectively reduce the amount of sodium and chloride ions in the body, lower dangerous excessives of fluid levels to acceptable limits and, in general, alleviate conditions usually associated with edema.

The (succinimidoaryloxy)alkanoic acids of this invention are products having the following general formula:

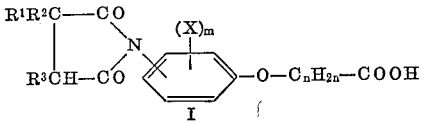

I wherein $R^1$ and $R^2$ are members selected from the group consisting of hydrogen, halogen and, taken together, a lower alkylidene group such as methylene, i.e., $=CH_2$, isopropylidene, etc., with the proviso that $R^1$ and $R^2$ cannot both be halogen; $R^3$ is a member selected from the group consisting of hydrogen and halogen, with the proviso that when $R^1$ and $R^2$ represent lower alkylidene, $R^3$ represents hydrogen; the X radicals are similar or dissimilar members selected from the group consisting of hydrogen, halogen, alkyl, for example, lower alkyl, alkoxy, for example, lower alkoxy and, taken together, two X radicals on adjacent carbon atoms of the benzene ring may be joined to form an hydrocarbylene chain, i.e., a divalent organic radical composed solely of carbon and hydrogen, containing from three to four carbon atoms between its points of attachment to the benzene ring, for example, trimethylene, tetramethylene, 1,3-butadienylene (i.e., —CH=CH—CH=CH—), etc.; $m$ is an integer having a value of one to four and $n$ is an integer having a value of one to four.

A preferred embodiment of this invention relates to (4-succinimidophenoxy)acetic acids having the following structural formula:

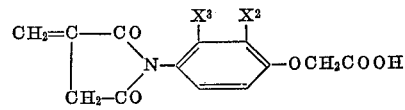

wherein $X^2$ and $X^3$ are similar or dissimilar members selected from the group consisting of hydrogen, halogen, lower alkyl and, taken together, may be joined to form a 1,3-butadienylene chain (i.e., $$-CH=CH-CH=CH-)$$

The foregoing class of compounds exhibits particularly good diuretic and saluretic activity and represents a preferred subgroup of compounds within the scope of this invention.

Those (succinimidoaryloxy)alkanoic acids which are substituted in the succinimido ring by a lower alkylidene group (Ia, infra) are conveniently prepared by treating an appropriate N-(carboxyalkoxyaryl) succinamic acid (II, infram) with a base such as sodium acetate, triethylamine, etc. in a suitable reagent as, for example, in an appropriate lower alkanoic acid anhydride such as acetic anhydride, propionic anhydride, etc., which may be present in excess to also serve as the reaction solvent. The following equation illustrates this method of preparation:

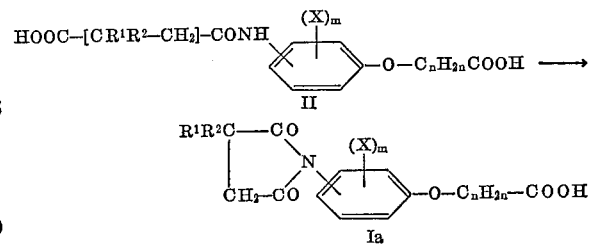

wherein $R^1$, $R^2$, X, $m$ and $n$ are as defined above.

Those (succinimidoaryloxy) alkanoic acid products of the invention which are substituted in the heterocyclic nucleus by a single halogen atom (Ib, infra) are obtained by treating an N-(carboxyalkoxyaryl)maleamic acid (III, infra) with a reagent which is capable of effecting halogenation and ring closure, such as phosphorus pentachloride, etc., followed by the treatment of the reaction mixture thus obtained with water. Also, the reaction of the N-(carboxyalkoxyaryl)maleamic acid with the halogenation and ring closing agent is most advantageously conducted with the application of heat. The following equation, wherein the halogenation and ring closing agent employed is phosphorus pentachloride, illustrates this method of preparation; however, it is to be understood that the use of phosphorus pentachloride in the equation is exemplary only and that other functionally equivalent halogenation and ring closing agents may be used in lieu thereof with similar results:

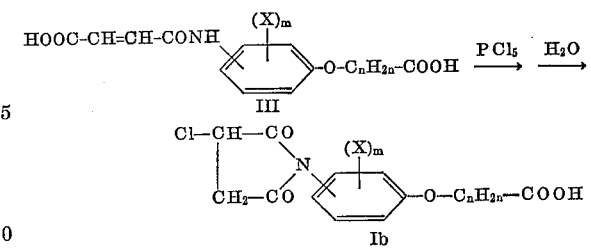

wherein X, $m$ and $n$ are as defined above.

Those (succinimidoaryloxy) alkanoic acid products which contain two halogen atoms in the heterocyclic nucleus (Ic, infra) are obtained by treating a suitable (maleimidoaryloxy) alkanoic acid (IV, infra) with a suitable halogenating agent, such as gaseous chlorine, in a suitable solvent as, for example, in a carboxylic acid solvent such as acetic acid. Preferably, the reaction is conducted with the application of heat, followed by cooling of the reaction mixture thus obtained to yield the desired (dihalosuccinimidoaryloxy)alkanoic acid (Ic). The following equation, wherein the halogenating agent employed is gaseous chlorine, illustrates this method of preparation; however, it is to be understood that the use of chlorine in the equation is exemplary only and that other functionally equivalent halogenating agents may be used in lieu thereof with similar results:

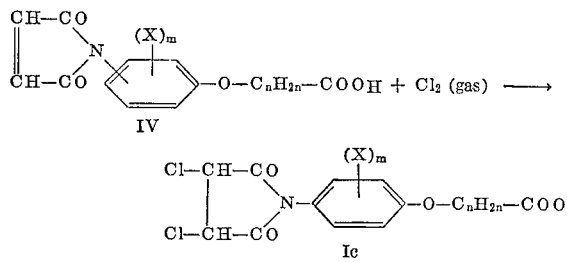

The (maleimidoaryloxy) alkanoic acids (IV, supra) which are depicted as starting materials in the foregoing halogenation process are the subject of applicants' copending application Ser. No. 538,957 filed Mar. 31, 1966.

The N-(carboxyalkoxyaryl)succinamic acids (II) and N-(carboxyalkoxyaryl)maleamic acids (III) described above in connection with the foregoing preparative methods are synthesized by several alternate routes, the choice of which depends largely upon the number and, also, upon the character of the substituents on the succinimido ring.

According to one method of preparation the N-(carboxyalkoxyaryl)maleamic acids (III) are prepared by treating a maleic anhydride (V, infra) with an appropriate nuclear amino substituted aryloxyalkanoic acid (VI, infra) in a suitable solvent as, for example, in a carboxylic acid such as acetic acid. Preferably, the reaction is conducted with the application of heat, followed by cooling of the reaction mixture thus obtained to yield the desired N-(carboxyalkoxyaryl)maleamic acid (III). The following equation illustrates the reaction:

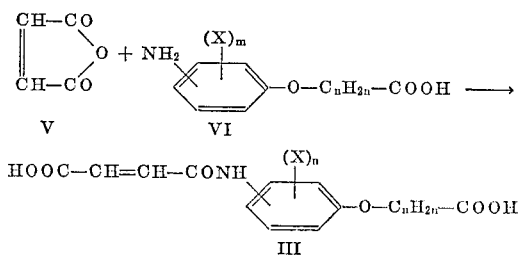

wherein X, $m$ and $n$ are as defined above.

Still another method for the preparation of the N-(carboxyalkoxyaryl)maleamic acid starting materials (III) consists in the reaction of an N-(hydroxy substituted aryl)maleamic acid (VII, infra) with an alkali metal alkoxide in alcohol and then with an haloalkanoic acid ester to obtain an N-(carboxyalkoxyaryl)maleamic acid ester, which ester is then saponified by treatment with a base and the resulting intermediate neutralized with acid to yield the desired N-(carboxyalkoxyaryl) maleamic acid (III). Suitable bases and acids which may be employed in the process include, for example, sodium hydroxide, hydrochloric acid, etc. The following equation wherein the alkali metal alkoxide and alcohol employed are sodium ethoxide and ethanol, respectively, illustrates this method of preparation:

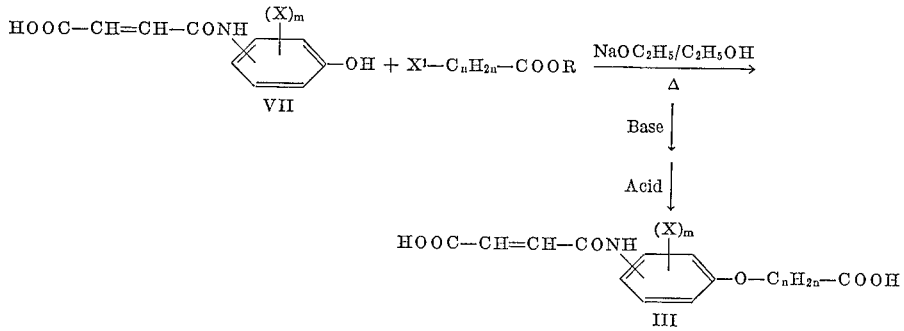

wherein R, $m$ and $n$ are as defined above and $X^1$ is halogen, for example, chlorine, bromine, etc.

A method for the preparation of the N-(carboxyalkoxyaryl)succinamic acid starting materials (II), and one which is particularly suitable for preparing those compounds which are intermediates in the preparation of products wherein two R substituents on a single carbon of the succinimido ring are joined to form a lower alkylidene group, such as methylene, isopropylidene, etc., consists in treating an appropriate succinic anhydride (VIII, infra) with an appropriate nuclear amino substituted aryloxyalkanoic acid (VI) in a suitable solvent as, for example, in an organic carboxylic acid such as acetic acid. The reaction is most advantageously conducted with the application of heat and the reaction mixture is then cooled to separate out the desired N-(carboxyalkoxyaryl)succinamic acid (II). The following equation illustrates this method of preparation:

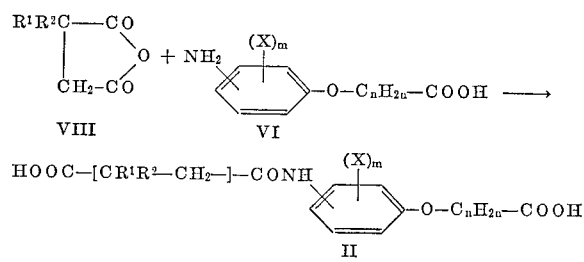

wherein $R^1$, $R^2$, X, $m$ and $n$ are as defined above.

The nuclear amino substituted aryloxyalkanoic acids (VI) employed as starting materials in the process of this invention are prepared from the appropriate nitrophenol by known methods. Thus, for example, a nitrophenol (IX, infra), which may be obtained from the corresponding phenol by the treatment thereof with nitric acid in a suitable solvent is converted to its sodium salt (X, infra) by treatment with an alkali metal alkoxide in alcohol and then allowed to react with an ester of an haloalkanoic acid, and the (nitrophenoxy)alkanoic acid ester (XI) thus formed is treated with a reducing agent as, for example, with hydrogen in the presence of a ruthenium on carbon catalyst, to convert the nitro derivative to the corresponding (aminophenoxy)alkanoic acid ester (XII), and the said ester is then saponified by conventional means to the desired acid (VI). Alternatively, in lieu of first treating the (nitrophenoxy)alkanoic acid ester (XI) with a reducing agent and saponifying the resulting (aminophenoxy)alkanoic acid ester (XII) to the (aminophenoxy)alkanoic acid (VI), the latter acid derivative may be obtained by first saponifying the (nitrophenoxy)alkanoic acid ester (XI) to the corresponding acid and treating the resulting (nitrophenoxy)alkanoic acid with a reducing agent to obtain the desired acid derivative (VI). The following equation, wherein the alkali metal alkoxide reagent employed is sodium ethoxide, illustrates this method of preparation:

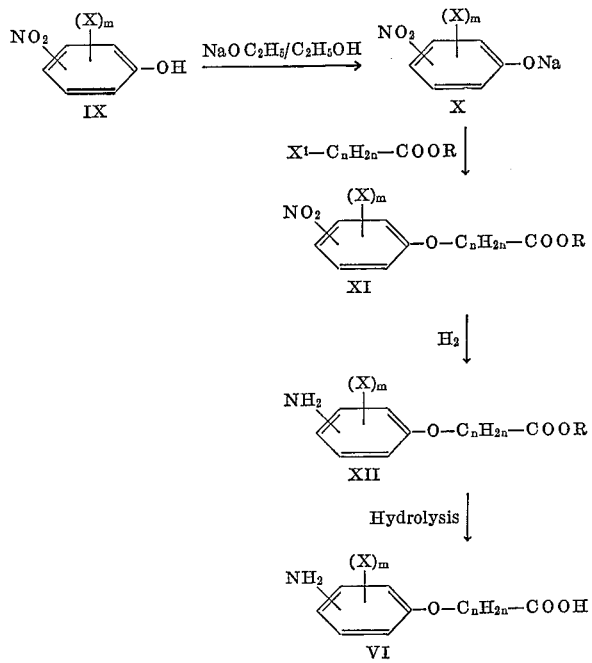

wherein X, $m$ and $n$ are as defined above; R is an hydrocarbyl radical, that is, an organic radical composed solely of carbon and hydrogen such as alkyl, etc. and $X^1$ is halogen, for example, chlorine, bromine, etc.

The (succinimidoaryloxy)alkanoic acids (I) of this invention are generally obtained as crystalline solids and, if desired, may be purified by recrystallization from a suitable solvent. Suitable solvents include, for example, acetic acid, acetonitrile, ethylene chloride, etc.

Included within the scope of this invention are the nontoxic, pharmacologically acceptable acid addition salts of the instant products (I). In general, any base which will form an acid addition salt with the (succinimidoaryloxy)alkanoic acids (I) and whose pharmacological properties will not cause an adverse physiological effect when ingested by the body system is considered as being within the scope of this invention; suitable bases thus include, for example, the alkali metal and alkaline earth metal hydroxides, carbonates, etc., ammonia, primary, secondary and teritary amines such as monoalkylamines, dialkylamines, trialkylamines, nitrogen containing heterocyclic amines, for example, piperidine, etc.

Also included within the scope of this invention are the ester and amide derivatives of the instant (succinimidoaryloxy)alkanoic acids (I) which may be prepared by several methods. According to one method the said ester derivatives are prepared by employing as reactants in the process of this invention the appropriate ester of the N-(carboxyalkoxyaryl)succinamic acid or N-(carboxyalkoxyaryl)maleamic acid starting materials described above in connection with the several methods for preparing the instant products (I). The said N-(carboxyalkoxyaryl)succinamic acid ester and maleamic acid ester reactants are conveniently synthesized by the reaction of a suitable maleic anhydride (V, supra) or succinic anhydride (VIII, supra) with the appropriate ester of a nuclear amino substituted aryloxyalkanoic acid (XII, supra) according to the method described above for the preparation of the N-(carboxyalkoxyaryl)maleamic acid (III) and N-(carboxyalkoxyaryl)succinamic acid (II) starting materials. Also, a convenient method for preparing the amide derivatives consists in the reaction of a (succinimidoaryloxy)alkanoic acid (I) with a special reagent such as dicyclohexylcarbodiimide, N-ethyl - 5 - phenylisoxazolium-3'-sulfonate, 1,1'-carbonyldiimidazole, 1,1'-thionyldiimidazole, etc. and treating the intermediate thus formed with ammonia or with a suitable amine to form the corresponding amide product. These and other equivalent methods for the preparation of the ester and amide derivatives of the instant products (I) will be apparent to those having ordinary skill in the art and to the extent that the said derivatives are both nontoxic and physiologically acceptable to the body system, the said esters and amides are the functional equivalents of the corresponding (succinimidoaryloxy)alkanoic acids (I).

The examples which follow illustrate the (succinimidoaryloxy)alkanoic acids (I) of the invention and the method by which they are prepared. However, the examples are illustrative only and it will be apparent to those having ordinary skill in the art that all of the products embraced by Formula I, supra, may also be prepared in an analogous manner by substituting the appropriate starting materials for those set forth in the examples.

EXAMPLE 1 p-(Methylenesuccinimido)phenoxyacetic acid

Step A: (p-Nitrophenoxy)acetic acid.—To a solution of sodium ethoxide in ethanol, prepared from 50% sodium hydride in mineral oil (21 g., 0.44 mole) in 200 ml. of ethanol, is added p-nitrophenol (55.6 g., 0.4 mole). Ethyl bromoacetate (73.5 g., 0.44 mole) is added and the reaction mixture is stirred at 27° C. for five hours. Ethanol is removed under reduced pressure and the resulting solid is suspended in 500 ml. of water and filtered. After recrystallization from a mixture of n-butyl chloride and hexane 66 g. of ethyl (p-nitrophenoxy)acetate is obtained.

The ethyl (p-nitrophenoxy)acetate is suspended in 500 ml. of 20% aqueous sodium hydroxide and heated to reflux. The resulting solution is cooled and acidified with hydrochloric acid to yield 50 g. of (p-nitrophenoxy)acetic acid melting at 184–186° C. after recrystallization from 50% methanol.

Step B: (p-Aminophenoxy)acetic acid.—(p-Nitrophenoxy)acetic acid (5 g.) is dissolved in 100 ml. of ethanol and hydrogenated over a palladium on carbon catalyst at 15 lbs./sq. in. for 1.5 hours. The reaction mixture is filtered to remove a mixture of product and catalyst. After recrystallization from water 3.3 g. of (p-aminophenoxy)acetic acid is obtained which decomposes at 220° C.

Step C: N-(p-carboxymethoxyphenyl)methylenesuccinamic acid.—(p-Aminophenoxy)acetic acid (3.35 g., 0.02 mole) is dissolved in a minimum amount of acetic acid at reflux. Methylenesuccinic anhydride (2.24 g., 0.02 mole) is added and the reaction mixture is allowed to cool slowly to room temperature. N-(p-carboxymethoxyphenyl)methylenesuccinamic acid crystallizes and is filtered to yield 4.8 g. of product.

Step D: p - (Methylenesuccinimido)phenoxyacetic acid.—The crude N-(p-carboxymethoxyphenyl)methylenesuccinamic acid (4.8 g., 0.017 mole) of Step C is added to acetic anhydride (50 ml.) containing sodium acetate (2 g.). The reaction mixture is heated at 100° C. for 40 minutes and concentrated to a solid residue. The residue is dissolved in a minimum amount of water and poured into 25 ml. of 10% hydrochloric acid. The solution is cooled, the p-(methylenesuccinimido)phenoxyacetic acid is filtered. After recrystallization from acetonitrile the p-(methylenesuccinimido)phenoxyacetic acid melts at 203–207° C.

Analysis for $C_{13}H_{11}NO_5$.—Calculated: C, 59.77; H, 4.24; N, 5.36. Found: C, 60.04; H, 4.51; N, 5.41.

EXAMPLE 2 p-(Chlorosuccinimido)phenoxyacetic acid

Step A: N-(p-hydroxyphenyl)maleamic acid.—To a solution of p-aminophenol (27.3 g., 0.25 mole) in 700 ml. of acetone is added a solution of maleic anhydride (25 g., 0.25 mole) in 100 ml. of water of ether. N-(p-hydroxyphenyl)maleamic acid crystallizes, is filtered and washed with acetone to yield 42 g., M.P. 203–205° C.

Step B: N-(p-carboxymethoxyphenyl)maleamic acid.— To a solution of sodium ethoxide, prepared from sodium (0.5 g., 0.02 mole) in 50 ml. of ethanol is added N-(p-hydroxyphenyl)maleamic acid (2.1 g., 0.01 mole), ethyl bromoacetate (3.34 g., 0.02 mole) is added and the solution refluxed for three hours. Aqueous potassium hydroxide (50 ml. of 2 N solution) is added and the reaction mixture maintained at 80° C. for 15 minutes. The solution is cooled and 120 ml. of 1 N hydrochloric acid is added. The product which crystallizes is filtered to yield 1.3 g. of N-(p-carboxymethoxyphenyl)maleamic acid, M.P. 194–195° C. After recrystallization from methanol the N-(p-carboxymethoxyphenyl)maleamic acid melts at 199–200° C.

Analysis for $C_{12}H_{11}NO_6$.—Calculated: C, 54.34; H, 4.18; N, 5.28. Found: C, 54.33; H, 4.17; N, 5.29.

Step C: p-(Chlorosuccinimido)phenoxyacetic acid.— A mixture of N-(p-carboxymethoxyphenyl)maleamic acid (1.3 g., 0.005 mole) and phosphorus pentachloride (1.2 g., 0.006 mole) is heated at 100° C. for five minutes. Ice is added to the reaction mixture and the resulting solid is dissolved in ether and insoluble material removed by filtration. The ether solution is concentrated to a solid which after recrystallization from ethylene chloride yields 0.35 g. of p-(chlorosuccinimido)phenoxyacetic acid melting at 170–171.5° C.

Analysis for $C_{12}H_{10}ClNO_5$.—Calculated: C, 50.81; H, 3.55; N, 4.94. Found: C, 50.42; H, 3.53; N, 4.96.

EXAMPLE 3

4-(chlorosuccinimido)-1-naphthyloxyacetic acid

Step A: N-(4-carboxymethoxy-1-naphthyl)maleamic acid.—N-(4-hydroxy-1-naphthyl)maleamic acid dihydrate (13.9 g., 0.05 mole) is added to a solution of sodium ethoxide (0.11 mole) in 100 ml. of ethanol. After stirring for five minutes, ethyl bromoacetate (18.4 g., 0.11 mole) is added and the solution refluxed for two hours. Sodium hydroxide (7.2 g., 0.18 mole) in 50 ml. of water is added and the solution stirred 15 minutes without external heat. The solution is acidified with hydrochloric acid and diluted to 450 ml. with water. On cooling the N-(4-carboxymethoxy-1-naphthyl)maleamic acid crystallizes and is filtered. Recrystallization from isopropyl alcohol yields 3 g. of N-(4-carboxymethoxy-1-naphthyl)maleamic acid which melts at 202–205° C.

Step B: 4-(chlorosuccinimido)-1-naphthyloxyacetic acid.—By following the procedure described in Example 2, Step C, but substituting N-(4-carboxymethoxy-1-naphthyl)-maleamic acid for the N-(p-carboxymethoxyphenyl) maleamic acid recited therein the product 4-(chlorosuccinimido)-1-naphthyloxyacetic acid is obtained. The product is recrystallized from a mixture of ethylene chloride and hexane to yield 4-(chlorosuccinimido)-1-naphthyloxyacetic acid which melts at 188.5–190° C.

Analysis for $C_{16}H_{12}ClNO_5$.—Calculated: C, 57.58; H, 3.63; N, 4.20. Found: C, 57.52; H, 3.78; N, 4.05.

EXAMPLE 4

3-chloro-4-succinimidophenoxyacetic acid

Step A: Ethyl (3-chloro-4-nitrophenoxy)acetate.—Sodium (20.4 g., 0.887 mole) is dissolved in absolute ethanol (750 ml.). To this solution is added 3-chloro-4-nitrophenol (154 g., 0.887 mole) dissolved in absolute ethanol (200 ml.). The solution is heated to boiling and ethyl bromoacetate (148 g., 0.887 mole) is added. The mixture then is heated for 16 hours, the alcohol distilled and water is added to the residue. The mixture is extracted with ether and the ether extract dried and evaporated. The residue is crystallized from ethanol to give 140 g. of ethyl (3-chloro-4-nitrophenoxy)acetate, M.P. 59–60° C.

Analysis for $C_{10}H_{10}ClNO_5$.—Calculated: C, 46.25; H, 3.88. Found: C, 56.60; H, 3.92.

Step B: Ethyl (3-chloro-4-aminophenoxy)acetate.—To a slurry of 10% ruthenium on carbon (1.5 g.) in ethanol, there is added a slurry of ethyl (3-chloro-4-nitrophenoxy) acetate (51.94 g., 0.02 mole) in ethanol (250 ml.). The mixture is hyrogenated in a Parr apparatus, the calculated amount of hydrogen being absorbed in 23 hours. Removal of the catalyst and solvent leaves ethyl (3-chloro-4-aminophenoxy)acetate (43 g.) which melts at approximately 67° C. This product is used in the next step without further purification.

Step C: (3-chloro-4-aminophenoxy)acetic acid.—Ethyl 3-chloro-4-aminophenoxy acetate (18 g.) is added to 100 ml. of 1 N sodium hydroxide and the suspension is heated at 100° C. until solution is complete. The solution is filtered and acidified with 100 ml. of 1 N hydrochloric acid. The solution is cooled and the crystallized product thus obtained is filtered to yield 14.8 g. of (3-chloro-4-aminophenoxy)acetic acid having a melting point of 165–167° C.

Step D: N-(2-chloro-4-carboxymethoxyphenyl)succinamic acid.—By substituting (3-chloro-4-aminophenoxy) acetic acid and succinic anhydride for the (p-aminophenoxy)acetic acid and methylenesuccinic anhydride of Example 1, Step C, and following substantially the procedure described therein, the product N-(2-chloro-4-carboxymethoxyphenyl)succinamic acid is obtained.

Step E: 3-chloro-4-succinimidophenoxyacetic acid.— By substituting the N-(2-chloro-4-carboxymethoxyphenyl)succinamic acid of Step D for the N-(p-carboxymethoxyphenyl)methylenesuccinamic acid of Example 1, Step D and following substantially the procedure described therein the product 3-chloro-4-succinimidophenoxyacetic acid is obtained.

EXAMPLE 5

(3-chloro-4-dichlorosuccinimidophenoxy)acetic acid

Step A: N-(2-chloro-4-carboxymethoxyphenyl)maleamic acid.—A solution of maleic anhydride (1.96 g., 0.02 mole) in 10 ml. of acetic acid is added to a solution of (3-chloro-4-aminophenoxy)acetic acid (4.0 g., 0.02 mole) in 50 ml. of acetic acid at reflux. The solution is allowed to cool slowly to 25° C. The crystalline product thus obtained is filtered to yield 5.5 g. of N-(2-chloro-4-carboxymethoxyphenyl)maleamic acid which melts at 151–152.5° C.

Step B: (3-chloro-4-maleimidophenoxy)acetic acid.— N-(2-chloro-4-carboxymethoxyphenyl)maleamic acid (1.3 g., 0.005 mole) is dissolved in 5 ml. of acetic anhydride containing triethylamine (1.5 g., 0.015 mole). The solution is heated at 100° C. for 15 minutes and is then poured into cold, dilute hydrochloric acid. After hydrolysis of the acetic anhydride is complete the mixture is extracted with ethyl acetate. The extract is dried over sodium sulfate and concentrated to yield an oil which is dissolved in ether and the resulting solution decanted from insoluble residue. Concentration of the ether yields 1.7 g. of crude (3-chloro-4-maleimidophenoxy)acetic acid which, after recrystallization from mixture of acetone and water, melts at 128–130° C.

Analysis for $C_{12}H_8ClNO_5$.—Calculated: C, 51.17; H, 2.86; N, 4.97. Found: C, 51.30; H, 3.11; N, 4.90.

Step C: (3-chloro-4-dichlorosuccinimidophenoxy)acetic acid.—Chlorine is passed into a solution of (3-chloro-4-maleimidapohenoxy)acetic acid (5 g.) in acetic acid (50 ml.) at 100° C. for 1.5 hours. The reaction mixture is cooled and the product crystallizes. After recrystallization from acetic acid, 3.5 g. of (3-chloro-4-dichlorosuccinimidophenoxy)acetic acid is obtained.

In a manner similar to that described in Example 1, Steps A–D, for the preparation of p-(methylenesuccinimido)phenoxyacetic acid, other (succinimidoaryl)alkanoic acid products of this invention may be obtained. Thus, by substituing the appropriate nitrophenol, ethyl bromoalkanoate and succinic anhydride for the p-nitrophenol,

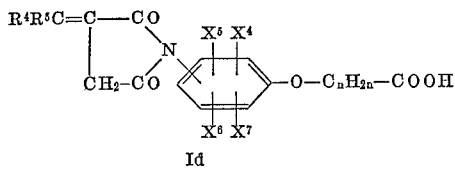

Id

TABLE I

| Ex. | R⁴ | R⁵ | X⁴ | X⁵ | X⁶ | X⁷ | —C$_n$H$_{2n}$— | Position |
|---|---|---|---|---|---|---|---|---|
| 6 | —CH₃ | —CH₃ | H | 3-CH₃ | 5-CH₃ | H | —CH₂—CH₂— | 4 |
| 7 | H | H | H | 3-Br | H | H | —CH₂— | 4 |
| 8 | H | H | 2-CH₃ | 3-CH₃ | H | H | —CH₂— | 4 |
| 9 | —CH₃ | —CH₃ | 2-Cl | 3-Cl | H | H | —CH₂— | 4 |
| 10 | —CH₃ | —CH₃ | H | 3-CH₃ | H | H | —CH₂—CH₂— | 4 |
| 11 | H | H | H | 3-Cl | H | H | —CH₂— | 5 |
| 12 | H | H | H | 3-CH₃ | H | H | —CH₂—CH₂— | 5 |
| 13 | H | H | 2-OCH₃ | H | H | H | —CH[CH(CH₃)₂]— | 4 |
| 14 | —CH₃ | —CH₃ | 2,3-CH=CH—CH=CH— | | H | H | —CH₂— | 4 |
| 15 | H | H | 2-CH₃ | 3-CH₃ | 5-CH₃ | 6-CH₃ | —CH₂—CH₂— | 4 |
| 16 | H | H | 2-CH₃ | 4-CH₃ | H | H | —CH(C₂H₅)CH₂— | 6 |
| 17 | —CH₃ | —CH₃ | 2,3-CH₂—CH₂—CH₂— | | H | H | —CH₂— | 4 |
| 18 | H | H | 2-Cl | H | 5-Cl | H | —CH₂—CH₂— | 4 |
| 19 | —CH₃ | —CH₃ | 2,3-CH₂—CH₂—CH₂— | | H | H | —CH₂— | 4 |
| 20 | —CH₃ | —CH₃ | 2-CH₃ | H | H | 6-CH₃ | —CH₂—CH₂— | 4 | ethyl bromoacetate and methylenesuccinic anhydride recited in Example 1, Steps A and C, and following substantially the procedure described in Steps A–D of that example, the (succinimidoaryloxy)alkanoic acid products (I) of this invention may be obtained. The following equations illustrate the reaction of Example 1, Steps A–D and, together with Table I, depicts the nitrophenol, ethyl bromoalkanoate and succinic anhydride starting materials of the process and the corresponding intermediate and products (Id, infra) produced therefrom. The last column in Table I denotes the position of succinimido group on the (succinimidoaryloxy)alkanoic acid nucleus depicted below as product Id:

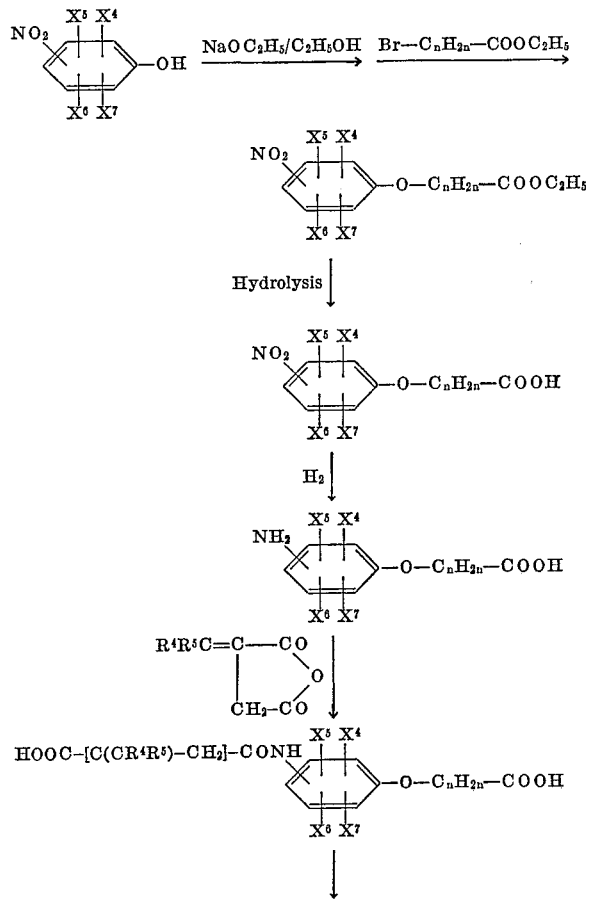

The products of the invention can be administered in a wide variety of therapeutic dosages in conventional vehicles as, for example, by oral administration in the form of a capsule or tablet as well as by intravenous injection. Also, the dosage of the products may be varied over a wide range as, for example, in the form of capsules or scored tablets containing 5, 10, 20, 25, 50, 100, 150, 250 and 500 milligrams, i.e., from 5 to about 500 milligrams, of the active ingredient for the symptomatic adjustment of the dosage to the patient to be treated. These dosages are well below the toxic or lethal dose of the products.

A suitable unit dosage form of the products of this invention can be administered by mixing 50 mg. of a (succinimidoaryloxy)alkanoic acid (I) or a suitable acid addition salt, ester or amide derivative thereof, with 144 mg. of lactose and 6 mg. of magnesium stearate and placing the 200 mg. mixture into a No. 3 gelatin capsule. Similarly, by employing more of the active ingredient and less lactose, other dosage forms can be put up in No. 3 gelatin capsules and, should it be necessary to mix more than 200 mg. of ingredients together, larger capsules may be employed. Compressed tablets, pills or other desired unit dosages can be prepared to incorporate the compounds of this invention by conventional methods and, if desired, can be made up as elixirs or as injectable solutions by methods well known to pharmacists.

It is also within the scope of this invention to combine two or more of the products of this invention in a unit dosage form or to combine one or more of the compounds with other known diuretics and saluretics or with other desired therapeutic and/or nutritive agents in dosage unit form.

The following example is included to illustrate the preparation of a representative dosage form:

EXAMPLE 21

Dry-filled capsules containing 50 mg. of active ingredient per capsule

| | Per capsule, mg. |
|---|---|
| p-(Methylenesuccinimido)phenoxyacetic acid | 50 |
| Lactose | 144 |
| Magnesium stearate | 6 |
| Capsule size No. 3 | 200 |

The p-(methylenesuccinimido)phenoxyacetic acid is reduced to a No. 60 powder and lactose and magnesium stearate are passed through a No. 60 bolting cloth onto the powder and the combined ingredients admixed for 10 minutes and then filled into No. 3 dry gelatin capsules.

Similar dry-filled capsules can be prepared by replacing the active ingredient of the above example by any of one or more of the other novel compounds of this invention and varying the amounts of the ingredients to obtain the desired dosage.

It will be apparent from the foregoing description that the (succinimidoaryloxy)alkanoic acid products (I) of this invention constitute a valuable class of compounds which have not been prepared heretofore. One skilled in the art will also appreciate that the processes disclosed in the above examples are merely illustrative and are capable of a wide variation and modification without departing from the spirit of this invention.

What is claimed is:

1. A member selected from the group consisting of a compound having the formula:

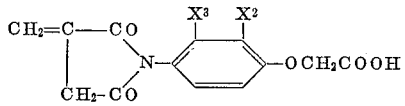

wherein $R^1$ and $R^2$ are members selected from the group consisting of hydrogen, halogen and, taken together, a lower alkylidene group, with the proviso that $R^1$ and $R^2$ cannot both be halogen; $R^3$ is a member selected from the group consisting of hydrogen and halogen, with the proviso that when $R^1$ and $R^2$ represent lower alkylidene, $R^3$ represents hydrogen; the X radicals are similar or dissimilar members selected from the group consisting of hydrogen, halogen, lower alkyl, lower alkoxy and, taken together, two X radicals on adjacent carbon atoms of the benzene ring are joined to form a chain selected from trimethylene, tetramethylene and 1,3-butadienylene; $m$ is an integer having a value of one to four and $n$ is an integer having a value of one to four; and the nontoxic, pharmacologically acceptable salts, alkyl esters and amides thereof.

2. A compound according to claim 1 having the formula:

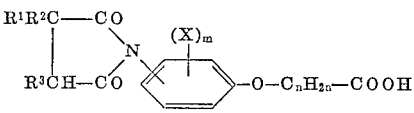

wherein $X^2$ and $X^3$ are similar or dissimilar members selected from the group consisting of hydrogen, halogen, lower alkyl and, taken together, are joined to form a 1,3-butadienylene chain.

3. The compound of claim 1 wherein $R^1$ and $R^2$ are hydrogen and $R^3$ is halogen.

4. The compound of claim 1 wherein $R^1$ is halogen, $R^2$ is hydrogen and $R^3$ is halogen.

5. p-(Methylenesuccinimido)phenoxyacetic acid.

6. p-(Chlorosuccinimido)phenoxyacetic acid.

No references cited.

ALEX MAZEL, Primary Examiner

JOSE TOVAR, Assistant Examiner

U.S. Cl. X.R.

424—274